May 1, 1934. P. K. SAUNDERS Re. 19,151

DIAPHRAGM VALVE

Original Filed Aug. 3, 1929 2 Sheets-Sheet 1

Inventor
Philip Keith Saunders

By A. Miller Belfield
Atty.

May 1, 1934. P. K. SAUNDERS Re. 19,151

DIAPHRAGM VALVE

Original Filed Aug. 3, 1929 2 Sheets-Sheet 2

Inventor
Philip Keith Saunders
By A. Miller Belfield
Atty.

Reissued May 1, 1934 Re. 19,151

UNITED STATES PATENT OFFICE 19,151

DIAPHRAGM VALVE

Philip Keith Saunders, Montreal, Quebec, Canada

Original No. 1,800,157, dated April 7, 1931, Serial No. 383,265, August 3, 1929. Application for reissue December 4, 1931, Serial No. 579,090. In Great Britain February 14, 1929

23 Claims. (Cl. 251—24)

This invention relates to valves of the kind wherein an obturating member in the form of a flexible diaphragm is arranged, in regulating the rate of flow of fluid through the valve to co-act with a seat between ports communicating with the inlet to and the outlet from the valve respectively.

Now the present invention has for its object to provide an improved construction of such valves which when opened shall afford for the fluid controlled, a stream line and nearly straight passage permitting of a high velocity flow without inducing substantial resistance such as would be encountered in valve bodies of the well known type having ports arranged concentrically with reference to an annular seating. It is also an object of the present invention to provide an improved construction of diaphragm valve which whilst applicable to the control of fluids generally, shall be especially suitable for regulating the flow of fluids of substantial density or fluids travelling at high velocity.

A further object of this invention is to produce a heavy duty valve, that is, one capable of controlling large or relatively large quantities of fluid at high or relatively high pressure, which valve shall be easily operated by manual means. Still another object of this invention is to provide means whereby the diaphragm shall in all positions be supported against the fluid pressure to which it is subjected or, under certain circumstances, by fluid pressure.

Figure 1:
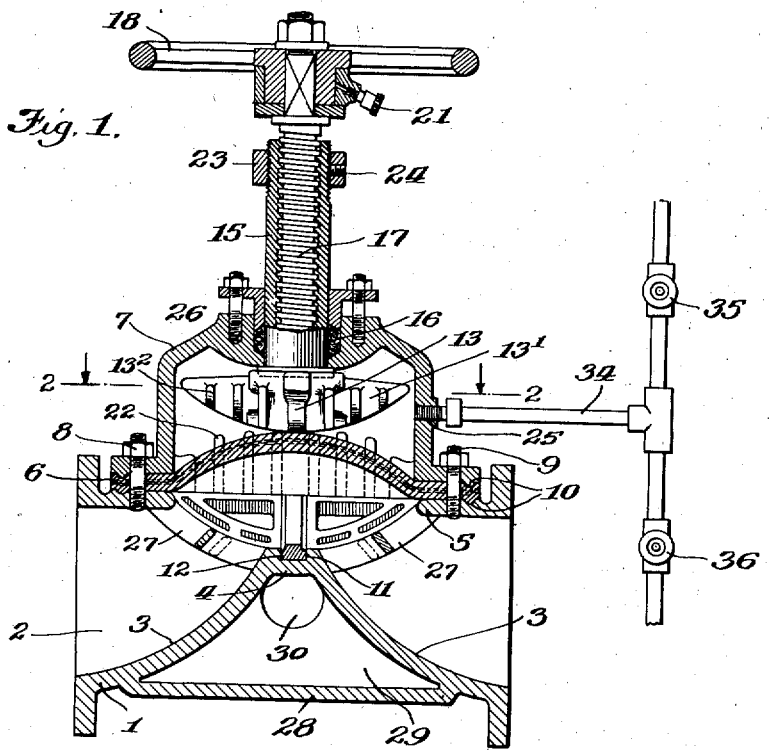

With these and other objects in view, the present invention consists primarily in providing the valve with a body having a substantially straight-through bore or passage intersected by a shallow weir which extends across the width of the bore and part way of its depth and is formed with a downwardly or concavely curved upper face that constitutes the seat with which the diaphragm co-operates. The bore or passage through the valve which is entirely devoid of sudden bends or angles which might induce eddies or otherwise impede a free flow of the fluid, curves gradually up to and down from the top of the weir and the width of the body is enlarged at its centre of length to compensate for the reduction of height arising from the presence of the weir. In some cases the increase of width may be such as to obtain a bore or passage which gives a constant cross-sectional area throughout when the valve is fully opened. As however this sometimes results in a bulky and expensive construction it is frequently found expedient to so proportion the dimensions of the body that the bore therethrough when the valve is fully opened converges gradually by regular decrements from the inlet to the weir and diverges gradually by regular increments from the weir to the outlet, as illustrated in Figure 1, somewhat in the manner of the well known Venturi tube. In the convergent divergent form of construction the maximum constriction which occurs at a point where the weir is situated may represent ⅔ or more of the full bore at the inlet and outlet of the valve. The flexible diaphragm forming the closure member is clamped between flanges formed on the valve body and its cover, which flanges may be fluted, serrated or otherwise roughened on their abutting faces to increase the grip upon the diaphragm.

The diaphragm itself is preferably composed of a rubberized fabric consisting of one or more layers of woven fabric connected together and coated on both surfaces with rubber, the coating of rubber being of a greater thickness on that side which co-acts with the valve seat. The seat itself is preferably faced with an inset of rubber which is not subject to pitting and scoring as is metal and which may be readily renewed when required. This rubber inset also obviates any tendency on the part of the diaphragm to adhere in the closed position.

Actuation of the valve may be effected manually by screw mechanism or equivalent means which are arranged in the cover of the valve and include a rigid backing member that engages the diaphragm directly and when necessary presses it into close contact with the seat. This backing member carries also a plurality of fingers which intermesh with corresponding fingers provided in the cover of the valve, and these moving and stationary fingers co-operate one with another in supporting the diaphragm at all times against the pressure applied to the underside of the diaphragm.

These and other features are hereinafter more fully described with reference to the accompanying drawings, in which:—

Figure 2:
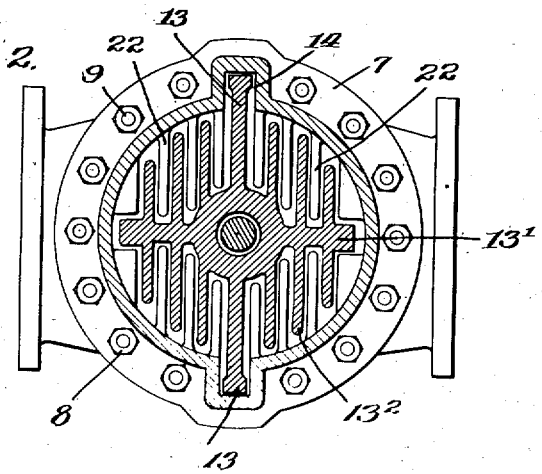
Figure 3:
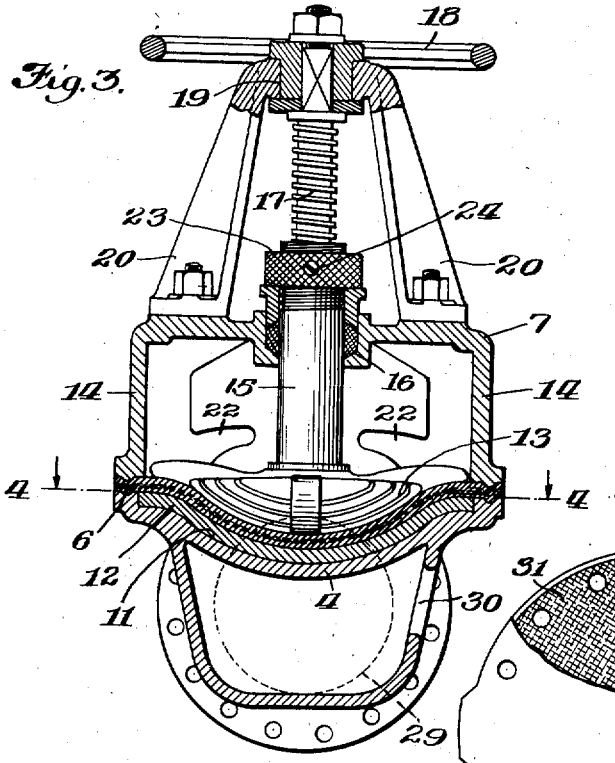
Figure 5:
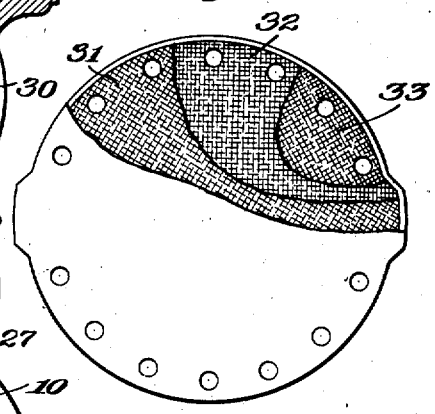
Figure 4:
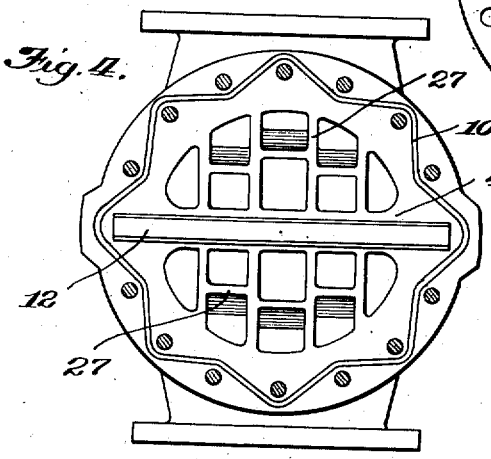
Figure 6:
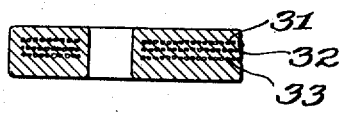

Fig. 1 is a longitudinal sectional elevation of an improved diaphragm valve constructed in accordance with this invention, the valve being shown in the fully opened position, Fig. 2 is a sectional plan of the same taken on the line 2—2 of Fig. 1, Fig. 3 is a transverse sectional elevation of the valve in the fully closed position, Fig. 4 is a sectional plan of the same taken on the line 4—4 of Fig. 3 and with the diaphragm removed, Fig. 5 is a plan view partly in section illustrating a preferred form of diaphragm, and Fig. 6 is a radial section of a portion of the flexible diaphragm of Fig. 5 shown on an enlarged scale.

Referring to these drawings which show a diaphragm valve of the screw-down type constructed according to this invention it will be seen that the valve body 1 is cast with a substantially straight through bore or passage 2, whilst the base wall 3 rises gradually from the inlet and outlet ends forming a shallow weir 4 which has a downwardly curved upper face and intersects the passage 2 intermediate its ends. The body is widened correspondingly at its centre of length to ensure that a slight reduction only of cross-sectional area of the valve passage occurs at the centre of the valve when the latter is fully opened. Alternatively the valve body may be so dimensioned as to obtain a bore or passage of uniform cross-sectional area when the valve is opened. On its upper side the valve body 1 is formed with an annular flange 5 to which the flexible diaphragm 6 and the valve cover or bonnet 7 are adapted to be securely clamped as by nuts 8 screwing on to studs 9 fixed in the body. The faces of the flange 5 and the cover 7 which abut against the flexible diaphragm 6 are preferably formed with complementary ribs and grooves 10 to ensure a strong and fluid tight joint being made with the diaphragm. Alternatively these faces may be serrated or otherwise roughened to obtain a similar effect. The space defined by the flange 5 constitutes a concave or part-spherical recess into which the inlet and outlet open by substantially D-shaped or semicircular ports separated by the upper edge of the weir 4. These ports are preferably intersected by webs or grids 27 as will be later stated.

The internal surfaces of the valve body are rounded at all points where any change of direction in the flow of liquid occurs in order that the fluid may pass unimpeded and to prevent the formation of eddies, and also where contact is made with the flexible diaphragm, as for instance, at the inner edge of the annular flange 5. The bonnet or cover 7 is also rounded at those portions of the cover which contact with the diaphragm in order that the diaphragm may not be damaged by contact with any sharp edges of metal.

The flexible diaphragm 6 employed is preferably composed of india-rubber reinforced with a layer or layers of fabric connected together and coated on both sides with rubber which is vulcanized to render the construction strong and capable of resisting heavy wear, the rubber coating on the underside of the diaphragm, i. e., that which co-acts with the seating being of greater thickness than on the reverse side, as shown in Fig. 6. As india-rubber when pressed for a time in contact with a surface of metal is apt to adhere, it is preferred to face the seat for the diaphragm valve with rubber and for this reason the upper edge of the weir 4 is formed with a dovetail or undercut groove 11 adapted to receive a strip 12 of rubber of corresponding section which is cemented or otherwise secured in position in said groove, said strip extending the full length of the weir and part way into the flange 5 where it is compressed tightly by the diaphragm 6.

On its upper side the diaphragm 6 is engaged by a rigid backing member which in the example illustrated comprises a transverse sector shaped compression bar 13, a longitudinal sector shaped bar 13′ projecting at right angles thereto and further sector shaped bars or fingers $13^2$ arranged on either side of and parallel with the central compression bar, the whole being made as an integral casting. The ends of the compression bar 13 project into and are guided in recesses 14 in the wall of the cover 7 and thus render the backing member as a whole capable of sliding axially within the cover without however rotating.

An internally screw threaded sleeve 15 rigid with said backing member passes through a stuffing box 16 in the cover 7 and is operatively connected externally of the valve with a screw spindle 17 arranged to be actuated by a hand wheel 18. The boss of the hand wheel 18 is rotatably mounted in a bearing 19 formed in a yoke 20 connected to the valve cover and a Stauffer or other lubricator 21 may be provided upon said bearing.

The central sector shaped compression bar 13 which extends transversely of the valve is adapted when depressed to force the diaphragm 6 down onto the rubber inset 12 forming the facing to the weir and also onto the flanged edges of the body and thus to isolate completely the inlet port from the outlet port. The curvature of the underface of the backing member as a whole corresponds with that of the recess into which the inlet and outlet ports open and the seat having regard to the thickness of the diaphragm itself. From the inner wall of the cover 7 project fixed bars or fingers 22 having curved under faces corresponding to the curvature of the upper side of the diaphragm when the valve is opened. These fixed bars or fingers are aligned vertically with the spaces between the bars or fingers in the backing member 13 so that the fixed and moving fingers may mesh one with another as the valve is operated and cooperate in supporting the thrusts imposed by the pressure fluid acting on the underside of the diaphragm. The edges of the fixed and moving support fingers are well rounded in order to prevent damage being inflicted upon the diaphragm with which they contact. The position and the curvature of the under faces of the fixed support fingers is such as to enable the diaphragm when the valve is fully opened to acquire the same degree of flexure upwardly as it experiences in a downward direction when closed, thus giving a maximum effective area for flow with a minimum distortion in the diaphragm.

Though in the example just discussed the support fingers are arranged transversely and longitudinally of the valve they may be arranged in radial or any other formation desired and these fingers may be either cast upon the bonnet or cover or may be otherwise formed.

In order to obviate undue compression of the diaphragm upon the seat as might occur due to the hand wheel 18 being screwed down too tightly, adjustable stop means may be provided taking the form of a collar 23 screwed upon the upper end of the sleeve 15 and adapted to be locked in any position of adjustment as by a grub screw 24. This collar is so positioned upon the sleeve 15 as to abut firmly upon the gland of the stuffing box 16 when the diaphragm is compressed sufficiently for the purpose of closing the valve.

In the case of valves of large capacity or valves handling fluids at high pressures, undue effort may be required for actuating the hand wheel 18. This difficulty may however be overcome by introducing to the closed space within the cover 7 a fluid under pressure as for example, that being controlled by the valve, in order that it may, by acting on the upper side of the diaphragm assist the operation of the valve. Such means for introducing fluid under pressure is illustrated in Figure 1 wherein 34 designates a pipe for introducing pressure fluid, which pipe is connected with the cover at 25. Any suitable auxiliary valve or cock device, as for instance the valves 35 and 36, may be provided for regulating the admission of such pressure fluid and its release as and when necessary. The valve 35 may control the inlet of fluid pressure and the valve 36, the outlet or exhaust of fluid pressure. The inlet leg of the pipe 34 may be connected either to a separate source of fluid pressure or to the pipe, not shown, which is connected to the valve body 1.

If the source from which the fluid under pressure is drawn exceeds the pressure of the fluid controlled by the diaphragm valve, the actuation of the diaphragm valve may be effected entirely by the manipulation of the auxiliary valves or cocks 35 and 36 and with such an arrangement it becomes possible to obtain control of the diaphragm valve from any convenient position which may be more or less remote from the valve itself, with the additional advantage of being able to clamp the diaphragm positively to its seat when the valve is closed and thus prevent any unintended leakage through the valve due to relaxation of the fluid pressure from any cause whatever.

Under ordinary conditions when the diaphragm valve is to be actuated by means of fluid pressure as indicated, the hand-wheel 18 will first be turned to raise the backing member 13 to its uppermost position where it will leave the diaphragm free for operation. A packing washer 26 provided on the upper side of the backing member 13 then makes contact with the underside of the cover 7 and prevents leakage of fluid to the stuffing box 16.

When the closing of the valve is assisted or effected entirely by the action of fluid pressure, there is a somewhat heavy load applied to the upper side of the diaphragm, therefore it is preferred to provide in the inlet and outlet ports supporting grids 27 preferably formed by stream line intersecting webs cast integral with the valve body, the upper edges of said webs conforming to the concave form of valve seat. In order to strengthen and at the same time to improve the appearance of the valve body particularly in valves of the larger sizes it is preferred to cast the body with a longitudinally extending, transversely curved web 28 which on the underside of the valve connects the walls of the inlet and outlet ports and encloses a space 29 beneath the weir 4 to which access may be had through a hand hole 30 provided for the removal of coring sand. This space 29 may conveniently be utilized for storage purposes and may be rendered secure by the provision of any suitable cover device for closing the aperture 30.

While under some circumstances, the space 29 may be utilized for storage purposes, particularly in very large valves, the connecting web 28 is primarily designed for the purpose of strengthening the construction as a whole and to furthermore make the valve appear from the exterior to be of ordinary and normal design. Where a valve is constructed with two branches which extend upward to a medially disposed weir, as for instance the weir 4 as in Figure 1, it is liable to convey the impression of weakness and also an impression that it impedes the flow of fluid even when fully open. By providing the web 28, therefore, the valve body is greatly strengthened and this valve body is rendered of normal appearance and in the larger sized valves, a storage place is provided by the space 29.

Figs. 5 and 6 show a preferred form of construction of the flexible diaphragm wherein three separate layers of fabric reinforcement 31, 32, 33 are employed, these being incorporated in the structure with their threads running in different directions so as to ensure a high degree of strength in all radial directions. To prevent moisture gaining access to the fabric reinforcement and acting deleteriously thereon it is preferred to envelop the fabric entirely by the rubber covering. For this reason the fabric is, as shown in Fig. 5, made of slightly smaller diameter than the complete diaphragm, and is perforated near its edge with holes of a larger diameter than that of the studs 9 so that the rubber coating subsequently applied shall cover the fabric completely both at its edges and also about the stud holes. As has previously been stated the facing of rubber which is vulcanized throughout is thicker on the underside intended for contact with the seating.

I claim:—

1. A diaphragm valve comprising a body having a substantially straight passage intersected intermediate its ends by a shallow weir extending across the width of the passage and extending upward part way of the depth of the passage, the weir being formed with a downwardly curved upper face constituting a seat, the body having an opening above said seat, and a diaphragm mounted upon the body and extending across said opening, said diaphragm co-operating with the seat, and means for depressing or raising said diaphragm toward or from the seat, the body being formed with inwardly extending fingers having upwardly curved lower faces by which the diaphragm is supported against strain when the diaphragm is in its valve opening position.

2. A diaphragm valve comprising a body having a substantially straight passage intersected by a transversely extending weir, the weir extending upward part of the depth of the passage and having an inwardly curved face constituting a diaphragm seat, the body having an opening above the weir, a bonnet disposed over the opening, a diaphragm extending across the opening and coacting with the seat, a diaphragm operable member movable through the bonnet toward or from the seat and having a substantially convex lower face formed to provide a plurality of fingers curved away from the diaphragm.

3. A diaphragm valve comprising a body having a substantially straight passage intersected by a transversely extending weir, the weir extending upward part of the depth of the passage and having an inwardly curved face constituting a diaphragm seat, the body having an opening above the weir, a bonnet disposed over the opening, a diaphragm extending across the opening and coacting with the seat, a diaphragm operable member movable through the bonnet toward or from the seat and having a substantially convex lower face formed to provide a plurality of fingers curved away from the diaphragm, the body having fingers extending across the opening in the body, the fingers having upwardly curved lower faces and interdigitating with the fingers on said diaphragm operating member.

4. A diaphragm valve comprising a body having a substantially straight passage intersected by a transversely extending weir, the weir extending upward part of the depth of the passage and having an inwardly curved face constituting a diaphragm seat, the body having an opening above the weir, a diaphragm disposed across said opening and cooperating with the seat, means for depressing the diaphragm against the seat but permitting the diaphragm to move away from said seat and means on the body and on the diaphragm depressing means supporting the diaphragm against the pressure on the inside face of the diaphragm in all positions of the diaphragm.

5. In a diaphragm valve, a body having a substantially straight passage intersected by a transversely extending weir, the weir extending upward part of the depth of the passage and having an inwardly curved face constituting a diaphragm seat, the body having an opening above the weir, the diaphragm extending across said opening, means for actuating the diaphragm including a screw and a backing member adapted to directly engage the diaphragm, the backing member comprising a diaphragm compressing bar, and diaphragm supporting bars or fingers, the supporting bars or fingers having their inner faces curved upward and outward and stationary diaphragm supporting members or fingers curved upward and inward with which the first named bars or fingers interdigitate.

6. In a diaphragm valve, a body having a substantially straight passage intersected by a transversely extending weir, the weir extending upward part of the depth of the passage and having an inwardly curved face constituting a diaphragm seat, the body having an opening above the weir, a diaphragm disposed over said opening and resting upon the wall defining the opening, a bonnet disposed over the opening and resting upon the diaphragm and holding the diaphragm in place upon the body, the bonnet having diaphragm supporting bars or fingers, and means for actuating the diaphragm including a screw mechanism and a backing member engaging the diaphragm, and comprising a diaphragm compressing bar and diaphragm supporting bars or fingers which intermesh with the diaphragm supporting bars or fingers on the bonnet.

7. In a diaphragm valve, a body having an opening, a diaphragm extending across the opening, a bonnet disposed above the diaphragm and having stationary diaphragm supporting bars or fingers, and a backing member for actuating the diaphragm, the backing member comprising a diaphragm compressing bar and diaphragm supporting bars or fingers which latter mesh with the diaphragm supporting bars or fingers on the bonnet, and means extending through the bonnet for actuating the backing member.

8. A diaphragm valve comprising a body, having a substantially straight passage intersected by a transversely extending weir extending upward part of the depth of the passage, the weir having an inwardly curved face constituting the diaphragm seat, the body having an opening above the weir, a diaphragm disposed across said opening, a bonnet mounted upon the body and holding the diaphragm in place, a backing member disposed in the bonnet for actuating the diaphragm, the backing member having its under face curved to conform to the curvature of the upper face of the weir and when fully moved inward compressing the diaphragm not only upon the seat formed upon the upper face of the weir, but also upon the upper face of the wall defining the opening through the body below the diaphragm.

9. A diaphragm valve according to claim 7 wherein the movable and stationary supporting bars or fingers are shaped to cause the diaphragm to assume a spherical shape in both of its extreme positions and be equally distorted in either position.

10. In a diaphragm valve, a body having a longitudinal bore and a lateral opening, the body having a transversely extending weir, the upper face of which is inwardly curved and extended upward at each end to the upper face of the wall defining said opening, a diaphragm supported on said wall, and means outward of the diaphragm whereby it may be forced against the upper face of the weir but permitted to move away therefrom, the opposite lateral faces of the weir being curved to merge gradually into the bore, said weir defining the flat sides of two substantially semi-circular ports, one on each side of the weir, said ports being intersected by diaphragm supporting grids.

11. In a diaphragm valve, a body having a longitudinal bore and a lateral opening, the body having a transversely extending weir, the upper face of which is inwardly curved and extended upward at each end to the upper face of the wall defining said opening, the upper face of the weir having a non-metallic inset extending the full length of the weir and a diaphragm supported on said wall and means outward of said diaphragm whereby it may be forced against said inset in the face of the weir but permitted to move away from the face of the weir.

12. In a diaphragm valve, a body having a longitudinal bore and a lateral opening, the body having a transversely extending weir, the upper face of which is inwardly curved and extended upward at each end to the upper face of the wall defining said opening, the upper edge face of the weir being grooved and an inset of rubber disposed in said groove and upon which a diaphragm may be clamped, the groove and said inset extending into the wall defining the lateral opening and a diaphragm resting upon said wall and extending over the ends of said inset and a bonnet resting upon said margin of the diaphragm whereby the inset is gripped between the margin of the wall defining the opening and the diaphragm.

13. A diaphragm valve comprising a body having a concave seat for the diaphragm of the valve and also having a diaphragm actuating plunger, said plunger being provided with separated bars or fingers and other bars or fingers for cooperating with the bars or fingers on the plunger for backing the diaphragm.

14. A diaphragm valve comprising a diaphragm seat having D-shaped ports provided with reenforcing grids.

15. A diaphragm valve having a Venturi passage when the valve is open formed by the valve body and the diaphragm, a seat for the diaphragm when in valve closing position, and a plunger for actuating said diaphragm to control said passage.

16. A diaphragm valve comprising a valve body having a substantially straight passage intersected between its ends by a shallow weir extending across the width of the passage and extending upward partway of the depth of the passage, the weir being formed with an upper face constituting a seat, the body having an opening above the seat, a diaphragm mounted upon the body and extending across said opening, said diaphragm cooperating with the seat, means for actuating the diaphragm to move it toward said seat and permit it to separate from the same and oppositely and equally curved supporting means for holding the diaphragm in an equally bowed condition in opening and closing positions.

17. A diaphragm valve comprising a body having a substantially straight passage intersected between its ends by a shallow weir extending across the width of the passage and upward partway of the depth thereof, said weir being provided with an upper face constituting a seat, the valve body having an opening opposite said weir, a diaphragm extending across said opening and cooperating with said seat, means for actuating the diaphragm to move the same toward the seat to close the valve and to permit the diaphragm to move away from the seat to open the valve, and means for backing the diaphragm in open and closed positions, said means being equally and oppositely curved so that the diaphragm is bowed an equal amount in opening and closing positions.

18. A diaphragm valve comprising a body having a substantially straight passage intersected between its ends by a shallow weir extending across the width of the passage and upward partway of the depth thereof, said weir being provided with an upper face constituting a seat, the valve body having an opening opposite said weir, a diaphragm extending across said opening and cooperating with said seat and means for backing the diaphragm in open and closed positions, said means being equally and oppositely curved so that the diaphragm is bowed an equal amount in opening and closing, a plunger for actuating the diaphragm and moving it toward the seat to close the valve and for permitting the diaphragm to move away from the seat to open the valve.

19. A diaphragm valve comprising a body having a substantially straight passage intersected between its ends by a shallow weir extending across the width of the passage and upward partway of the depth thereof, said weir being provided with an upper face constituting a seat, the body having an opening above said seat, a diaphragm extending across said opening and cooperating with the seat to open and close the valve, and a plunger to actuate the diaphragm to depress it to cause it to contact with said seat, said plunger being mounted to permit its retraction to allow the diaphragm to bow upwardly and the weir seat being located to permit the diaphragm to contact it to close the valve when said diaphragm is bowed down to an extent substantially equal to the amount it is bowed upwardly when open.

20. A diaphragm valve comprising a body having a substantially straight passage intersected between its ends by a shallow weir extending across the width of the passage and upward partway of the depth thereof, said weir being provided with an upper face constituting a seat, the body having an opening above said seat, a diaphragm extending across said opening and cooperating with the seat to open and close the valve, and a plunger to actuate the diaphragm to depress it to cause it to contact with said seat, said plunger being mounted to permit its retraction to allow the diaphragm to bow upwardly and the weir seat being located to permit the diaphragm to contact it to close the valve when said diaphragm is bowed down to an extent substantially equal to the amount it is bowed upwardly when open, said plunger being mounted to rest in an upper position to back the diaphragm when in said upper open position.

21. A diaphragm valve comprising a body having a substantially straight passage intersected between its ends by a shallow weir extending across the width of the passage and upward partway of the depth thereof, said weir being provided with an upper face constituting a seat, the body having an opening above said seat, a diaphragm extending across said opening and cooperating with the seat to open and close the valve, and a plunger to actuate the diaphragm to depress it to cause it to contact with said seat, said plunger being mounted to permit its retraction to an extent to allow the diaphragm to bow upwardly substantially its maximum extent in opening and said weir seat being located to engage the diaphragm when it is bowed downwardly to substantially its maximum extent to close the valve.

22. A diaphragm valve comprising a body having a substantially straight passage intersected between its ends by a shallow weir extending across the width of the passage and upward partway of the depth thereof, said weir being provided with an upper face constituting a seat, the body having an opening above said seat, a diaphragm extending across said opening and cooperating with the seat to open and close the valve, and a plunger to actuate the diaphragm to depress it to cause it to contact with said seat, said plunger being mounted to permit its retraction to an extent to allow the diaphragm to bow upwardly substantially its maximum extent in opening and said weir seat being located to engage the diaphragm when it is bowed downwardly to substantially its maximum extent to close the valve, said plunger being arranged to rest in position to serve in backing the diaphragm when it is bowed upwardly to open the valve and means at the sides of said weir to serve in backing the diaphragm when it is bowed down to close the valve.

23. A valve of the type described having a diaphragm valve, a concave seat for said diaphragm valve, a diaphragm actuating plunger, and means above said diaphragm to provide a backing therefor, said means and said plunger adapted to cooperate to form a backing for the diaphragm valve in an open position. Said means and seat being equally bowed in opposite directions to hold the diaphragm in equally bowed condition in open and closed positions.

PHILIP KEITH SAUNDERS.